US009619061B2

(12) United States Patent
Lee et al.

(10) Patent No.: US 9,619,061 B2
(45) Date of Patent: Apr. 11, 2017

(54) DISPLAY DEVICE AND CONTROL METHOD THEREOF

(71) Applicant: LG ELECTRONICS INC., Seoul (KR)

(72) Inventors: Doyoung Lee, Seoul (KR); Yongsin Kim, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/092,347

(22) Filed: Nov. 27, 2013

(65) Prior Publication Data

US 2015/0062025 A1   Mar. 5, 2015

(30) Foreign Application Priority Data

Sep. 3, 2013   (KR) .......................... 10-2013-0105521

(51) Int. Cl.
| | | |
|---|---|---|
| *G06F 3/041* | (2006.01) | |
| *G06F 1/16* | (2006.01) | |
| *H04M 1/02* | (2006.01) | |
| *H04M 19/04* | (2006.01) | |

(52) U.S. Cl.
CPC .......... *G06F 3/0412* (2013.01); *G06F 1/1615* (2013.01); *G06F 1/1626* (2013.01); *G06F 1/1641* (2013.01); *G06F 1/1643* (2013.01); *G06F 1/1652* (2013.01); *G06F 1/1677* (2013.01); *G06F 1/1684* (2013.01); *H04M 1/0243* (2013.01); *H04M 19/04* (2013.01)

(58) Field of Classification Search
CPC .... G06F 3/0412; G06F 1/1615; G06F 1/1626; G06F 1/1641; G06F 1/1652; G06F 1/1677; G06F 1/1684; G06F 1/1643; H04M 1/02
See application file for complete search history.

(56) References Cited

U.S. PATENT DOCUMENTS

| | | | | |
|---|---|---|---|---|
| 2010/0302179 | A1* | 12/2010 | Ahn et al. ..................... | 345/173 |
| 2011/0242361 | A1* | 10/2011 | Kuwahara et al. ......... | 348/231.4 |
| 2012/0319960 | A1* | 12/2012 | Kildal ................... | G06F 3/0487 345/173 |
| 2013/0265257 | A1* | 10/2013 | Jung et al. .................... | 345/173 |
| 2013/0321340 | A1* | 12/2013 | Seo et al. ...................... | 345/174 |
| 2014/0029017 | A1* | 1/2014 | Lee et al. ...................... | 356/601 |
| 2014/0055375 | A1* | 2/2014 | Kim et al. .................... | 345/173 |
| 2014/0062976 | A1* | 3/2014 | Park et al. .................... | 345/204 |
| 2014/0157125 | A1* | 6/2014 | Seo ............................... | 715/716 |
| 2014/0218321 | A1* | 8/2014 | Lee ....................... | G06F 1/1652 345/173 |
| 2015/0022472 | A1* | 1/2015 | Jung .................... | G06F 3/0487 345/173 |

FOREIGN PATENT DOCUMENTS

| | | |
|---|---|---|
| JP | 2011-139258 A | 7/2011 |
| KR | 10-2006-0020350 A | 3/2006 |
| KR | 10-0662465 B1 | 1/2007 |
| KR | 10-2010-0067933 A | 6/2010 |
| WO | WO 2012/108715 A2 | 8/2012 |

* cited by examiner

*Primary Examiner* — Christopher E Leiby
(74) *Attorney, Agent, or Firm* — Birch, Stewart, Kolasch & Birch, LLP

(57) ABSTRACT

Disclosed are a display device and a control method thereof. More particularly, disclosed is a method of providing various notification modes based on a folding angle of a foldable display device and a bending angle of a flexible display device.

20 Claims, 7 Drawing Sheets

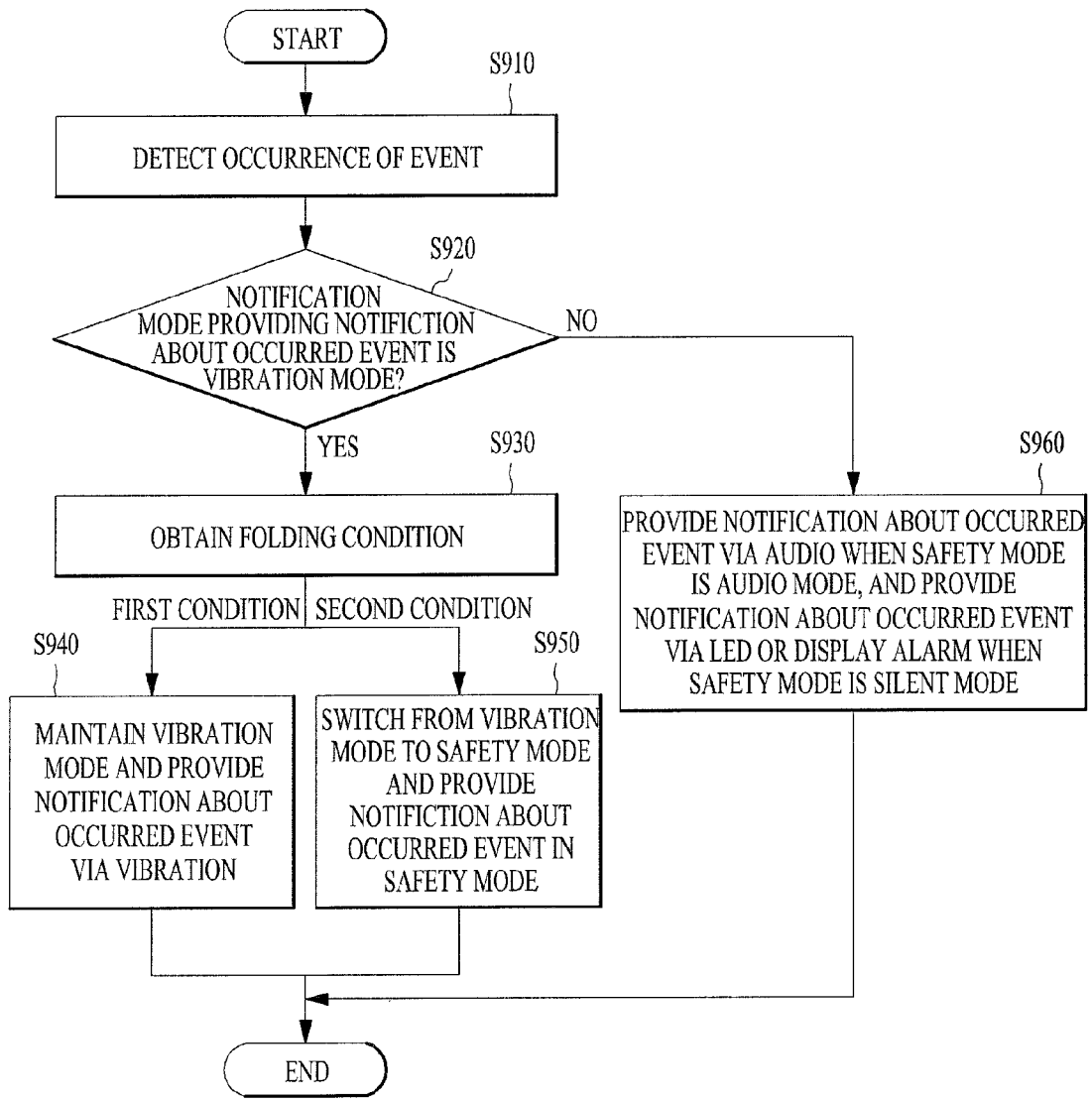

DISPLAY DEVICE AND CONTROL METHOD THEREOF

Pursuant to 35 U.S.C. §119(a), this application claims the benefit of Korean Patent Application No. 10-2013-0105521, filed on, Sep. 3, 2013, which is hereby incorporated by reference as if fully set forth herein.

BACKGROUND OF THE INVENTION

Field of the Invention

The present disclosure relates to a display device and a control method thereof, and more particularly to a method of providing various notification modes based on a folding angle of a foldable display device and a bending angle of a flexible display device.

Discussion of the Related Art

Flexible display technology and foldable display technology have been developed. A flexible display is freely bendable, and thus may be utilized in a wearable device, for example. In addition, a foldable display, more particularly one having a large size may be folded several times, thus achieving extreme ease of portability.

When using a foldable display or flexible display, a device may not only be laid on a floor or table, but may also be vertically oriented on a floor or table. However, the display oriented approximately vertically may have low stability because the device is relatively thin or according to a folding angle of a foldable display or a bending angle of a flexible display. For instance, if a folding angle of a foldable display is small, the standing foldable display may fall over due to vibration.

SUMMARY OF THE INVENTION

Accordingly, embodiments are directed to a display device and a control method thereof that substantially obviate one or more problems due to limitations and disadvantages of the related art.

According to one embodiment, an object of the present disclosure is to provide a notification about occurred event in a vibration mode if a standing display device has a stable folding angle in the vibration mode.

According to another embodiment, an object of the present disclosure is to provide a notification about occurred event in a safety mode if a standing display device has an unstable folding angle in the vibration mode.

According to another embodiment, an object of the present disclosure is to provide a notification about occurred event in a variety of modes based on a folding angle of a dual folder display device or a triple folder display device.

According to a further embodiment, an object of the present disclosure is to provide a notification about occurred event in a variety of modes based on a bending angle of a standing flexible display device.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a display device according to one embodiment includes a first body and a second body, wherein a folding portion is provided between the first body and the second body, an angle sensing unit configured to sense a folding angle between the first body and the second body, an input sensing unit configured to detect an input signal and to transmit a detected result to a processor, a display unit configured to display visual information, and the processor configured to control the angle sensing unit, the input sensing unit, and the display unit, wherein the processor is further configured to detect occurrence of an event, if a notification mode that provides a notification about occurred event is a vibration mode, obtain a folding condition, wherein the folding condition includes a first condition in which the folding angle between the first body and the second body is within a predetermined angle range and a second condition in which the folding angle is outside the predetermined angle range, if the folding condition is the first condition, maintain the vibration mode, and provides the notification about the occurred event via vibration, and if the folding condition is the second condition, switch from the vibration mode to a safety mode and provide the notification about the occurred event in the safety mode, wherein the safety mode represents a notification mode different from the vibration mode.

In accordance with another embodiment, a display device includes a bendable body, an angle sensing unit configured to sense a bending angle of the body, an input sensing unit configured to detect an input signal and to transmit a detected result to a processor, a display unit configured to display visual information, and the processor configured to control the angle sensing unit, the input sensing unit, and the display unit, wherein the processor is further configured to detect occurrence of an event, if a notification mode that provides a notification about the occurred event is a vibration mode, the processor is under a bending condition, wherein the bending condition includes a first condition in which the bending angle of the body is within a predetermined angle range and a second condition in which the bending angle is outside the predetermined angle range, if the bending condition is the first condition, maintain the vibration mode, and to provide the notification about the occurred event via vibration, and if the bending condition is the second condition, switch from the vibration mode to a safety mode and provide the notification about the occurred event in the safety mode.

In accordance with another embodiment, a control method of a display device, includes detecting occurrence of an event, obtaining a folding condition if a notification mode that provides a notification about the occurred event is a vibration mode, wherein the folding condition includes a first condition in which a folding angle between a first body and a second body of the display device is within a predetermined angle range, and a second condition in which the folding angle is outside the predetermined angle range, maintaining the vibration mode, and providing the notification about the occurred event via vibration if the folding condition is the first condition, and switching from the vibration mode to a safety mode, and providing the notification about the occurred event in the safety mode if the folding condition is the second condition.

In accordance with a further embodiment, a control method of a display device, includes detecting occurrence of an event, obtaining a bending condition if a notification mode that provides a notification about the occurred event is a vibration mode, wherein the bending condition includes a first condition in which a bending angle of a body of the display device is within a predetermined angle range and a second condition in which the bending angle is outside the predetermined angle range, maintaining the vibration mode, and providing the notification about the occurred event via vibration if the bending condition is the first condition, and switching from the vibration mode to a safety mode, and providing the notification about the occurred event in the safety mode if the bending condition is the second condition.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 9 is a flowchart of a control method of a display device according to the present disclosure.

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

A display device described in the present disclosure may include various shapes of display devices that may display images, such as, for example, a PC, a Personal Digital Assistant (PDA), a laptop computer, a tablet PC, and a smart-phone. For instance, the display device may include a dual folder display device, a triple folder display device, and a flexible display device. In addition, the display device of the present disclosure may include a touchscreen.

Figure 1:
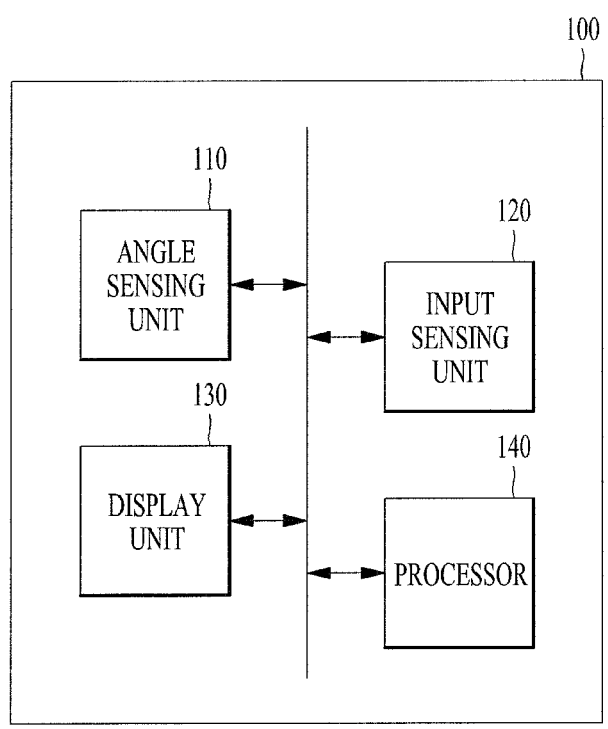
FIG. 1 is a block diagram of a display device according to the present disclosure.

FIG. 1 is a block diagram of a display device according to the present disclosure. It is noted that FIG. 1 shows but one embodiment and some constituent modules may be omitted or new constituent modules may be added as those skilled in the art will readily comprehend.

As exemplarily shown in FIG. 1, the display device, designated by reference numeral 100, according to one embodiment may include an angle sensing unit 110, an input sensing unit 120, a display unit 130, and a processor 140.

The display device 100 may include a body equipped with the angle sensing unit 110, the input sensing unit 120, the display unit 130, and the processor 140. Here, the body may include a first body and a second body, and a folding portion may be provided between the first body and the second body. In addition, the angle sensing unit 110, the input sensing unit 120, the display unit 130, and the processor 140 may be installed to at least one of the first body and the second body. This will hereinafter be described in greater detail with reference to FIG. 2.

The sensing unit may employ at least one sensor installed to the display device 100 to sense a surrounding environment of the display device 100 and transmit a sensed result in the form of a signal to the processor 140.

The sensing unit may include at least one sensing means. In one embodiment, the at least one sensing means may include various sensing means, such as, for example, a gravity sensor, geomagnetic sensor, motion sensor, gyro sensor, accelerometer, infrared sensor, inclination sensor, brightness sensor, height sensor, olfactory sensor, temperature sensor, depth sensor, pressure sensor, bending sensor, audio sensor, video sensor, Global Positioning System (GPS) sensor, grip sensor, and touch sensor.

The sensing unit is a generic term for the above enumerated various sensing means. The sensing unit may sense a variety of user inputs and an environment of the display device 100, and transmit a sensed result to the processor 140 to allow the processor 140 to implement an operation based on the sensed result. The above enumerated sensors may be provided as individual elements included in the display device 100, or may be combined to constitute at least one element included in the display device 100.

In the present disclosure, the sensing unit may include the angle sensing unit 110 and the input sensing unit 120. The angle sensing unit 110 may sense a folding angle or bending angle of the display device 100. For example, if the display device 100 includes a first body and a second body, the angle sensing unit 110 may sense a folding angle between the first body and the second body. Also, for example, if the display device 100 includes a first body, a second body, and a third body, the angle sensing unit 110 may sense a first folding angle between the first body and the second body, and a second folding angle between the second body and the third body. Also, for example, if the display device 100 includes a bendable body, the angle sensing unit 110 may sense a bending angle of the bendable body.

The input sensing unit 120 may detect an input signal, and transmit a detected result to the processor 140. For instance, the input sensing unit 120 may detect a direct touch input and a proximity touch input. The direct touch input is a touch input wherein a finger of a user directly touches a display screen. The direct touch input may include a simple touch, a long touch, a touch-and-drag, a multi-touch, and the like. The proximity touch input is a touch input wherein a user's finger remains a distance from a desired touch point, rather than directly touching a display screen. The proximity touch input may include a hovering touch.

The display unit 130 may display visual information. In addition, the display unit 130 may output visual information on a display screen based on an application and content executed by the processor 140 or a control instruction of the processor 140. Here, the visual information may include still images, moving images, and the like.

In the present disclosure, the display unit 130 may include a foldable display screen. In addition, the display device 100 is foldable on the basis of the folding portion. As such, the foldable display screen may be folded. In the present disclosure, alternatively, the display unit 130 may include a bendable display screen. In addition, the display device 100 is bendable. As such, the bendable display screen may be bent.

The processor 140 may detect a signal transmitted from at least one of the angle sensing unit 110, the input sensing unit 120, and the display unit 130, and control the display device 100 according to the signal.

More specifically, the processor 140 may detect a signal via at least one of the angle sensing unit 110, the input sensing unit 120, and the display unit 130 among signals transmitted from constituent units. In addition, the processor 140 may detect a signal generated based upon a user input that is received from a specific sensor among plural received signals. For instance, if the input sensing unit 110 senses a user input, the processor 140 may detect a signal corresponding to the input using a sensed result.

Hereinafter, in the case in which each step or operation to be implemented by the display device 100 begins or proceeds based upon a user input, it is noted that a procedure of generating a signal depending on the user input is included in a description of the above step or operation even though the procedure is not repeatedly described.

In addition, it is noted that the processor 140 will be described as controlling the display device 100 or constituent units included in the display device 100 according to a user input, and the processor 140 and the display device 100 may be regarded in the same light.

Although not shown in FIG. 1, the display device 100 may further include a storage unit, a communication unit, an audio input/output unit, a vibration activating unit, a Light Emitting Diode (LED) activating unit, a power unit, and the like.

The storage unit may store various digital data including audio, photographs, moving images, applications, and the like. The storage unit refers to various digital data storage spaces, such as a flash memory, a Random Access Memory (RAM), a Solid State Drive (SSD), and the like.

The storage unit may temporarily store data received from an external device through the communication unit. In this case, the storage unit may be used in buffering to output data, received from the external device, on the display device 100. In addition, the storage unit may store content displayed on the display device 100.

The communication unit may implement communication with the external device using various protocols to receive or transmit data. In addition, the communication unit may access an external network in a wired or wireless manner to receive or transmit digital data, such as content, applications, and the like.

The audio input/output unit includes audio input means, such as, for example, a microphone, and audio output means, such as, for example, a speaker. In addition, the audio input/output unit may receive or output voice based on content executed by the processor 140 or a control instruction of the processor 140.

The vibration activating unit may generate vibration by activating a vibration motor. In addition, the vibration activating unit may generate vibration based on content executed by the processor 140 or a control instruction of the processor 140.

The LED activating unit may activate an LED light equipped in the display device 100. In addition, the LED activating unit may activate the LED light based on content executed by the processor 140 or a control instruction of the processor 140.

The power unit is a power source connected to a battery inside the device or an external power source, and may supply power to the display device 100.

In FIG. 1 as a block diagram of the display device 100 according to one embodiment, separately shown blocks logically distinguish elements of the device 100. Accordingly, the elements of the above-described device may be mounted as a single chip or a plurality of chips based on device design.

Figure 2:
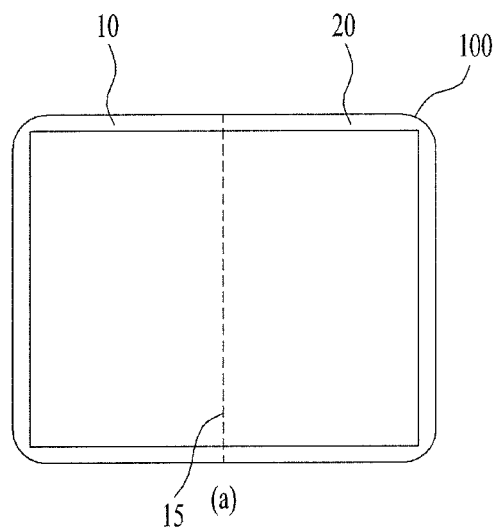
FIG. 2 is a view showing an embodiment of a display device according to the present disclosure.
Figure 2:
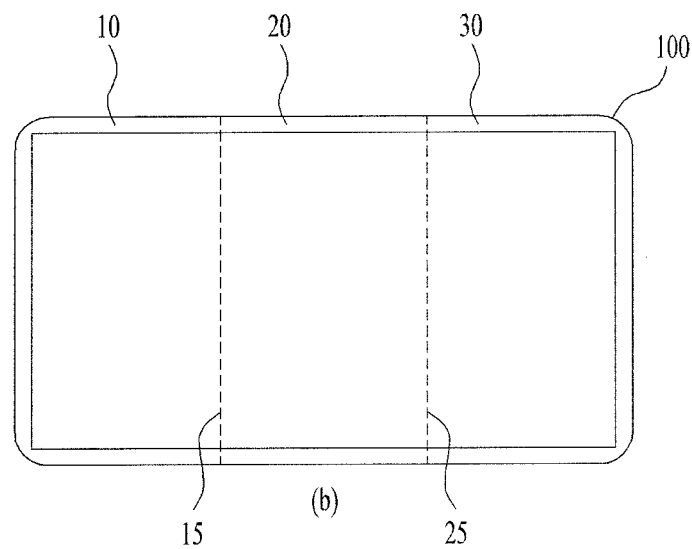

FIG. 2 is a view showing an embodiment of a display device according to the present disclosure. More specifically, FIG. 2(a) shows a dual folder display device, and FIG. 2(b) shows a triple folder display device.

As exemplarily shown in FIG. 2(a), the display device 100 may include a first body 10 and a second body 20. In addition, a folding portion 15 may be provided between the first body 10 and the second body 20. In the display device 100, the first body 10 and the second body 20 may be folded in opposite directions about the folding portion 15.

The display device 100 may sense a folding angle between the first body 10 and the second body 20. In FIG. 2(a), a folding angle between the first body 10 and the second body 20 may be 180°. An embodiment of the dual folder display device 100 as exemplarily shown in FIG. 2(a) will further be described later with reference to FIGS. 3 to 5.

As exemplarily shown in FIG. 2(b), the display device 100 may include the first body 10, the second body 20, and a third body 30. In addition, the folding portion 15 may be provided between the first body 10 and the second body 20. Likewise, a second folding portion 25 may be provided between the second body 20 and the third body 30. In the display device 100, the first body 10, the second body 20, and the third body 30 may be folded in opposite directions about the first folding portion 15 and the second folding portion 25.

The display device 100 may sense a folding angle between the first body 10 and the second body 20 and a folding angle between the second body 20 and the third body 30. In FIG. 2(a), a folding angle between the first body 10 and the second body 20 may be 180°, and a folding angle between the second body 20 and the third body 30 may be 180°. An embodiment of the triple folder display device 100 as exemplarily shown in FIG. 2(b) will further be described later with reference to FIGS. 6 and 7.

Figure 3:
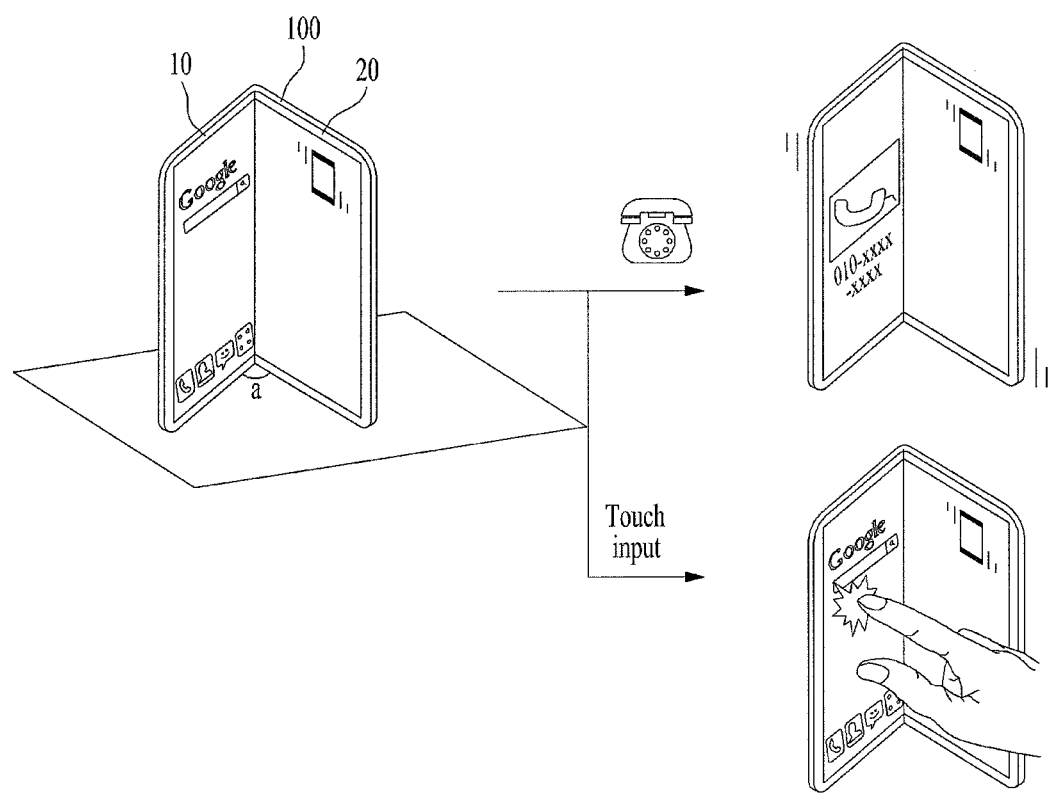
FIG. 3 is a view showing a first embodiment of a control method of a display device according to the present disclosure.

FIG. 3 is a view showing a first embodiment of a control method of a display device according to the present disclosure. More specifically, the left part of FIG. 3 shows the standing display device 100 under a folding condition, the right upper part of FIG. 3 shows a notification mode of the display device 100, and the right left part of FIG. 3 shows detection of a direct touch input.

As exemplarily shown in the left part of FIG. 3, the display device 100 may be in a standing position by lower surfaces of the first body 10 and the second body 20. The display device 100 may have front and rear surfaces as well as upper, lower, left, and right surfaces. In the present disclosure, assume that a longer side surface of the first body 10 or the second body 20 is a left surface or right surface, and a shorter side surface of the first body 10 or the second body 20 is an upper surface or lower surface.

When using the display device 100, the user may leave the display device 100 in vertical orientation. This may correspond to the left part of FIG. 3 in which a lower surface of the display device 100 comes into contact with a floor or table.

Meanwhile, the display device 100 exemplarily shown in FIG. 3 may correspond to a first condition in which a folding angle between the first body 10 and the second body 20 is within a predetermined angle range. Herein, the predetermined angle range refers to a range within which the display device 100 has a stable folding angle when the display device 100 is in a standing position by the lower surface thereof. In addition, the predetermined angle range corresponds to an angle that does not cause tilting of the display device 100 when the display device 100 provides a notification in a vibration mode. For instance, in the case of a display device including a single folding portion, the predetermined angle range may correspond to a range of 45° to 120°, and a range of 240° to 315°. In the left part of FIG. 3, an angle a may be 45° corresponding to the predetermined angle range. Here, it is noted that the predetermined angle range is not limited to the above-described example and may include various other angles according to device characteristics.

Meanwhile, as exemplarily shown in the right upper part of FIG. 3, the display device 100 may detect an event. Here, the event may correspond to call reception, text message reception, e-mail reception, Social Network Service (SNS) update, and the like. In FIG. 3, the event may correspond to call reception.

Next, the display device 100 may recognize a notification mode that provides a notification about the occurred event. The notification mode is a mode of the display device 100 that notifies the user of an event. For instance, the notification mode may include an audio mode, a silent mode, and a vibration mode. Although the present disclosure describes the aforementioned three modes as representative examples of the notification mode, various other notification modes may be included. As exemplarily shown in the left part of FIG. 3, the display device 100 may recognize that the notification mode is the vibration mode.

In addition, the display device 100 may obtain a folding condition. Herein, the folding condition may include a first condition in which a folding angle between the first body 10 and the second body 20 is within a predetermined angle range and a second condition in which a folding angle between the first body 10 and the second body 20 is outside a predetermined angle range. In the present disclosure, as described above, a folding condition of the display device 100 exemplarily shown in FIG. 3 may correspond to the first condition within a predetermined angle range.

In this case, the display device 100 may maintain a vibration mode, and provide a notification about the occurred event via vibration. That is, the display device 100 is stably standing, and therefore may provide a notification about the occurred event while maintaining a vibration mode.

As exemplarily shown in the right upper part of FIG. 3, the display device 100 may provide a notification via both a display alarm and vibration.

Meanwhile, if it is recognized that a notification mode of an event is an audio mode, the display device 100 may provide a notification about the occurred event via audio. In addition, if it is recognized that a notification mode of an event is a silent mode, the display device 100 may provide a notification about the occurred event via an LED alarm or display alarm. This is because movement of the display device 100 substantially does not occur when a notification is provided in an audio mode or silent mode, differently from that in a vibration mode, and thus the display device 100 may be standing without requiring consideration of a folding condition.

Here, the LED alarm refers to provision of a notification via the LED light provided at a front surface of the display device 100. In addition, the display alarm refers to provision of a notification using, e.g., an image displayed on a display screen.

In addition, the display device 100 may display an indicator representing the current notification mode. That is, the display device 100 may display indicators respectively representing a vibration mode, a silent mode, and an audio mode. Referring to FIG. 3, in the vibration notification mode, the display device 100 may display an indicator representing the vibration mode.

As exemplarily shown in the right lower part of FIG. 3, the display device 100 may detect a direct touch input with respect to the display unit 130 if a folding condition is the first condition. That the folding condition is the first condition means that the display device 100 is stably standing, and thus the display device 100 has less risk of tilting even if the display device 100 detects a direct touch input. In this case, the display device 100, which may detect a direct touch input, may ignore a proximity touch input.

Figure 4:
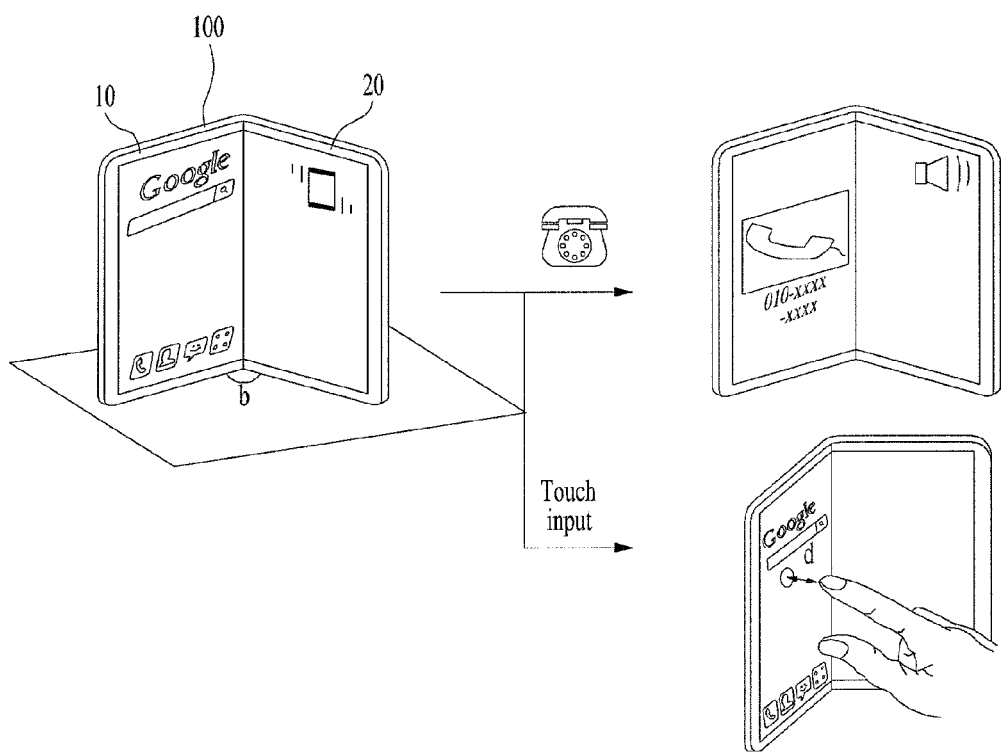
FIG. 4 is a view showing a second embodiment of a control method of a display device according to the present disclosure.

FIG. 4 is a view showing a second embodiment of a control method of a display device according to the present disclosure. More specifically, the left part of FIG. 4 shows the standing display device 100 under a folding condition, the right upper part of FIG. 4 shows a notification mode of the display device 100, and the right left part of FIG. 4 shows detection of a proximity touch input. The same configuration as that described with reference to FIG. 3 will not be described hereinafter.

The display device 100 exemplarily shown in FIG. 4 may correspond to a second condition in which a folding angle between the first body 10 and the second body 20 is outside a predetermined angle range. Herein, outside the predetermined angle range refers to a range within which the display device 100 has an unstable folding angle when the display device 100 is in a standing position by the lower surface thereof. In addition, outside the predetermined angle range corresponds to an unstable folding angle at which the display device 100 has difficulty in standing when the display device 100 provides a notification in a vibration mode. For instance, in the case of a display device including a single folding portion, outside the predetermined angle range may correspond to a range of 0° to 45°, a range of 120° to 240°, and a range of 315° to 360°. In the left part of FIG. 4, an angle b may be 130°. Herein, it is noted that outside the predetermined angle range is not limited to the above-described example and may include various other examples according to device characteristics.

Meanwhile, as exemplarily shown in the right upper part of FIG. 4, the display device 100 may detect occurrence of an event. Here, in FIG. 4, the event may correspond to call reception. In addition, the display device 100 may recognize a notification mode that provides a notification about the occurred event. As exemplarily shown in the left part of FIG. 4, the display device 100 may recognize that a notification mode is a vibration mode.

In addition, the display device 100 may obtain a folding condition. As described above, a folding condition of FIG. 4 may correspond to the second condition outside a predetermined angle range. In this case, the display device 100 may switch from a vibration mode to a safety mode, and provide a notification about the occurred event in the safety mode. Here, the safety mode is a notification mode different from the vibration mode, and corresponds to a mode in which the display device 100 is free from tilting and provides a notification in a safe standing attitude thereof. For instance, the safety mode may include an audio mode, a silent mode, and a weak vibration mode.

In one embodiment, if the safety mode is an audio mode, the display device 100 may provide a notification about the occurred event via audio. That is, as exemplarily shown in the right upper part of FIG. 4, the display device 100 may switch from a vibration mode to an audio mode, and provide a notification about call reception via an audio bell preset in the display device 100. In this way, the standing display device 100 may provide a notification via audio without a risk of tilting despite instability thereof due to an inappropriate folding angle.

In another embodiment, if the safety mode is a silent mode, the display device 100 may provide a notification about the occurred event via an LED alarm or display alarm. That is, the display device 100 may switch from a vibration mode to a silent mode, and provide a notification about call reception via an LED alarm or display alarm preset in the display device 100. As exemplarily shown in the right upper part of FIG. 4, the display device 100 may display a call indicator and a phone number of a caller as a display alarm for call reception. In addition, although not shown in FIG. 4, the display device 100 may activate an LED light equipped in the display device 100 as an LED alarm for call reception. In this way, the standing display device 100 may provide a notification via an LED alarm or display alarm without a risk of tilting despite instability thereof due to an inappropriate folding angle.

Also, in another embodiment, if the safety mode is a weaker vibration mode than the above-described vibration mode, the display device 100 may provide a notification about the occurred event via weak vibration. That is, although not shown in FIG. 4, the display device 100 may switch from the above-described vibration mode to a weak vibration mode, and provide a notification about call reception via weak vibration. As a result of providing a weaker vibration mode than the existing vibration mode, the standing display device 100 may provide a notification while reducing a risk of tilting.

Also, in another embodiment, if the safety mode is a vibration mode having a different vibration pattern from that of the above-described vibration mode, the display device 100 may provide a notification about the occurred event via a different vibration pattern. That is, although not shown in FIG. 4, the display device 100 may switch from the above-described vibration mode to a vibration mode having a different vibration pattern from that of the above-described vibration mode, and provide a notification about call reception via a different vibration pattern. Here, the vibration mode having a different vibration pattern may correspond to a mode in which the display device 100 implements weaker vibration than that in the existing vibration mode. As a result of providing a vibration mode having a different vibration pattern than the existing vibration mode, the standing display device 100 may provide a notification while reducing a risk of tilting.

In the case of providing a notification in the above-described safety mode, the display device 100 may provide a display alarm, simultaneously with provision of another safety mode notification, even if the current notification mode is not the silent mode providing the display alarm. This is because the user may more easily recognize occurrence of an event when the display alarm is additionally provided.

Meanwhile, as exemplarily shown in the right lower part of FIG. 4, if a folding condition is the second condition, the display device 100 may detect a proximity touch input with respect to the display unit 130. That is, in a state in which a distance between the user and the display device 100 is d, the display device 100 may detect a user position as an input. Since that the folding condition is the second condition means that the display device 100 is unstably standing, the display device 100 may be unintentionally tilted if the display device 100 detects a direct touch input. Therefore, in this case, the display device 100 may ignore a direct touch input.

Figure 5:
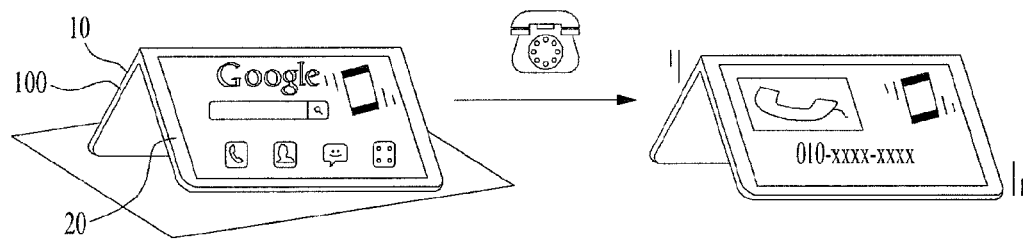
FIG. 5 is a view showing a third embodiment of a control method of a display device according to the present disclosure.

FIG. 5 is a view showing a third embodiment of a control method of a display device according to the present disclosure. More specifically, the left part of FIG. 5 shows the standing display device 100, and the right part of FIG. 5 shows a notification mode of the display device 100.

As exemplarily shown in the left part of FIG. 5, the display device 100 may be in a standing position by left and right surfaces of the first body 10 and the second body 20. As described above with reference to FIG. 3, assuming that a longer surface of the first body 10 or the second body 20 is a left surface or right surface, the left part of FIG. 5 may correspond to a state in which the display device 100 is in a standing position by left and right surfaces of the first body 10 and the second body 20.

The display device 100 may detect occurrence of an event. Here, the event may correspond to call reception. In addition, as exemplarily shown in the left part of FIG. 5, the display device 100 may recognize that a notification mode of the event is a vibration mode.

In this case, it will be appreciated that the display device 100 is more stable than as shown in FIGS. 3 and 4 because the display device 100 is in a standing position by a longer surface thereof. Accordingly, in the case in which the display device 100 is in a standing position by left and right surfaces of the first body 10 and the second body 20, the display device 100 may maintain a vibration mode regardless of a folding angle between the first body 10 and the second body 20, and provide a notification about the occurred event via vibration.

However, even in this case, as described above with reference to FIGS. 3 and 4, the display device 100 may be set to provide different notification modes according to whether a folding angle corresponds to the first condition or the second condition. In addition, although not shown in FIG. 5, the display device 100 may detect a direct touch input with respect to the display unit 130.

Meanwhile, although not shown in FIG. 5, the display device 100 may be oriented in such a manner that a front surface or a rear surface of at least one of the first body 10 and the second body 20 comes into contact with an object.

Herein, contact of the front surface or the rear surface may correspond to the case in which the front surface or the rear surface comes into contact with a table or floor. In this case, the display device 100 may maintain a vibration mode, and provide a notification about the occurred event via vibration. This is because the display device 100, a front surface or a rear surface of which comes into contact with an object, may provide stable vibration without a risk of tilting.

Figure 6:
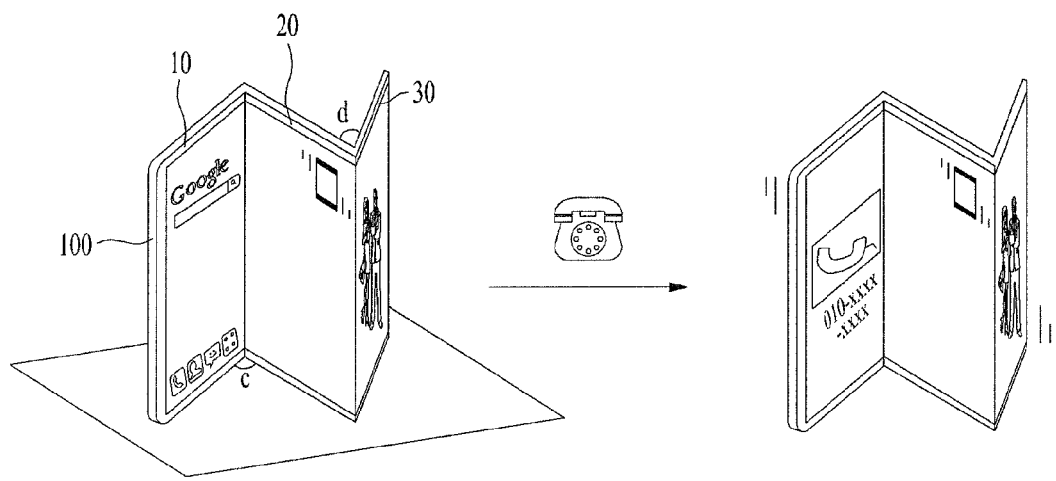
FIG. 6 is a view showing a fourth embodiment of a control method of a display device according to the present disclosure.

FIG. 6 is a view showing a fourth embodiment of a control method of a display device according to the present disclosure. More specifically, the left part of FIG. 6 shows the standing triple folder display device 100 under a folding condition, and the right part of FIG. 6 shows a notification mode of the triple folder display device 100.

As exemplarily shown in the left part of FIG. 6, the display device 100 is a triple folder display device, and may be in a standing position by lower surfaces of the first body 10, the second body 20, and the third body 30.

The display device 100 exemplarily shown in FIG. 6 may correspond to the first condition in which at least one of a first folding angle c between the first body 10 and the second body 20 and a folding angle d between the second body 20 and the third body 30 is within a predetermined angle range. That is, the triple folder display device may correspond to the first condition if at least one of the first folding angle c and the second folding angle d is within a predetermined angle range. This is because the display device 100 is stably standing if at least one of the first folding angle c and the second folding angle d is within a predetermined angle range. Here, the predetermined angle range may correspond to a range of 45° to 120°, and a range of 240° to 315° as described above with reference to FIG. 3. For instance, in FIG. 6, the first folding angle c may be 60°, and the second folding angle d may be 30°.

Meanwhile, as exemplarily shown in the right part of FIG. 6, the display device 100 may detect occurrence of an event. Here, the event may correspond to call reception. In addition, the display device 100 may recognize that a notification mode of the event is a vibration mode. As described above, the display device 100 may obtain a folding condition corresponding to the first condition in which a folding angle is within a predetermined angle range.

In this case, in the same manner as in the above-described dual folder display device of FIG. 3, the display device 100 may maintain a vibration mode, and provide a notification about the occurred event via vibration. That is, the display device 100 is stably standing, and thus may provide a notification while maintaining a vibration mode.

Although not shown in FIG. 6, the display device 100 may detect a direct touch input with respect to the display unit 130 if a folding condition is the first condition.

Figure 7:
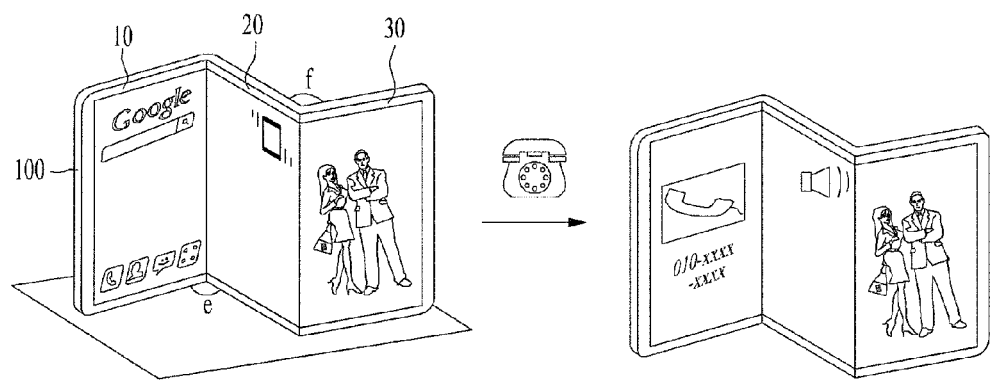
FIG. 7 is a view showing a fifth embodiment of a control method of a display device according to the present disclosure.

FIG. 7 is a view showing a fifth embodiment of a control method of a display device according to the present disclosure. More specifically, the left part of FIG. 7 shows the standing triple folder display device 100 under a folding condition, and the right part of FIG. 7 shows a notification mode of the triple folder display device 100.

As exemplarily shown in the left part of FIG. 7, the display device 100 is a triple folder display device, and may be in a standing position by lower surfaces of the second body 20, the second body 20, and the third body 30.

Also, the display device 100 exemplarily shown in FIG. 7 may correspond to the second condition in which a first folding angle e between the first body 10 and the second body 20 and a second folding angle f between the second body 20 and the third body 30 are outside a predetermined angle range. That is, the triple folder display device 100 may correspond to the second condition if both the first folding angle e and the second folding angle f are outside a predetermined angle range. This is because the display device 100 may be stably standing if at least one of the first folding angle e and the second folding angle f is within a predetermined angle range. Herein, outside the predetermined angle range may, as described above with reference to FIG. 4, may correspond to the case in which a folding angle is a range of 0° to 45°, a range of 120° to 240°, and a range of 315° to 360°. In addition, in FIG. 7, the first folding angle e may be 140°, and the second folding angle f may be 150°.

As exemplarily shown in FIG. 7, the display device 100 may detect occurrence of an event. Here, the event may correspond to call reception. In addition, the display device 100 may recognize that a notification mode of the event is a vibration mode. As described above, the display device 100 may obtain a folding condition corresponding to the second condition.

In this case, in the same manner as the above-described dual folder display device of FIG. 4, the display device 100 may switch from a vibration mode to a safety mode, and provide a notification about the occurred event in the safety mode. This serves to prevent tilting of the display device 100 via adoption of other modes except for a vibration mode because the display device 100 is unstably standing. In FIG. 7, the safety mode is an audio mode, and the display device 100 may provide a notification about call reception via audio. In addition, the safety mode may include a silent mode, a weak vibration mode, and other various vibration modes having different vibration patterns.

Although not shown in FIG. 7, the display device 100 may detect a proximate touch input with respect to the display unit 130 if a folding condition is the second condition. In addition, the display device 100 may ignore a direct touch input with respect to the display unit 130.

Figure 8:
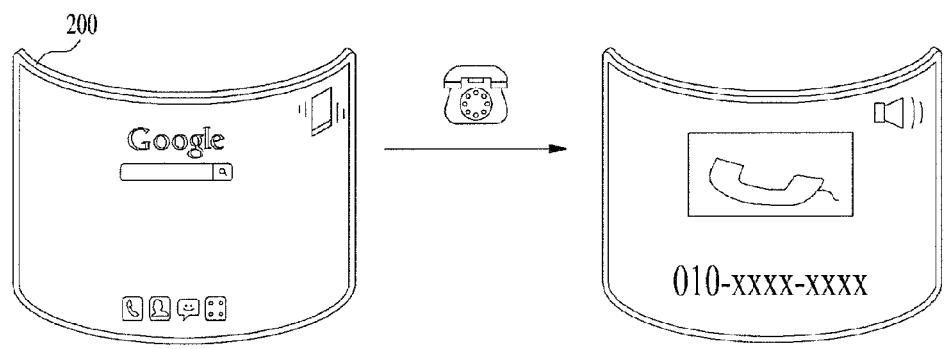
FIG. 8 is a view showing a sixth embodiment of a control method of a display device according to the present disclosure.

FIG. 8 is a view showing a sixth embodiment of a control method of a display device according to the present disclosure. More specifically, the left part of FIG. 8 shows a standing display device 200 under a bending condition, and the right part of FIG. 8 shows a notification mode of the display device 200.

As exemplarily shown in the left part of FIG. 8, the display device 200 is a flexible display device and may include a bendable body. In addition, the display device 200 may be in a standing position by one of upper and lower surfaces and left and right surfaces of the bendable body. Assumes that the display device 200 exemplarily shown in FIG. 8 is in a standing position by a lower surface thereof.

The display device 200 may recognize a bending angle of a body. The bending angle may be detected via at least one sensor provided at the sensing unit. For instance, the display device 200 may sense a bending degree based on pressure detected via a pressure sensor. In addition, for instance, if the body of the display device 200 bends, a gradient sensor may detect a bending direction, region, and strength by sensing a gradient. The bending angle may be recognized via various methods aside from the above-described examples.

The display device 200 may detect occurrence of an event. In FIG. 8, the event may correspond to call reception. In addition, the display device 200 may recognize that a notification mode of the event is a vibration mode.

The display device 200 may obtain a bending condition. Here, the bending condition may include a first condition in which a bending angle of the body is within a predetermined angle range and a second condition in which a bending angle of the body is outside a predetermined angle range. In FIG.

8, the bending condition may correspond to the second condition in which a bending angle is outside a predetermined angle range.

In this case, the display device 200 may switch from a vibration mode to a safety mode, and provide a notification about the occurred event in the safety mode. That is, in FIG. 8, the display device 200 may switch from a vibration mode to an audio mode, and provide a notification in the audio mode.

Also, although not shown in FIG. 8, if a bending condition is the first condition, the display device 100 may maintain a vibration mode, and provide an notification about the occurred event in the vibration mode. On the other hand, if a bending condition is the second condition, the display device 100 may ignore a direct touch input and detect a proximate touch input.

FIG. 9 is a flowchart of a control method of a display device according to the present disclosure.

First, the display device 100 may detect occurrence of an event (S910). As described above with reference to FIG. 3, here, the event may correspond to call reception, text message reception, e-mail reception, SNS update, and the like.

Next, the display device 100 may determine whether or not a notification mode of an event is a vibration mode (S920). As described above with reference to FIG. 3, the notification mode represents a mode of the display device 100 that notifies the user of occurrence of an event. For instance, the notification mode may include an audio mode, a silent mode, and a vibration mode.

In operation S920, if the notification mode of the event is a vibration mode, the display device 100 may obtain a folding condition (S930). As described above with reference to FIG. 3, here, the folding condition may include a first condition in which a folding angle between a first body and a second body is within a predetermined angle range and a second condition in which the folding angle between the first body and the second body is outside the predetermined angle range.

If the folding condition is the first condition, the display device 100 may maintain a vibration mode, and provide a notification about the occurred event via vibration (S940). That is, the display device 100 is stably standing, and thus may provide an notification about the occurred event via vibration while maintaining a vibration mode. If the folding condition is the first condition, the display device 100 may detect a direct touch input with respect to the display unit 130.

If the folding condition is the second condition, the display device 100 may switch from the vibration mode to a safety mode, and provide an notification about the occurred event in the safety mode (S950). Here, the safety mode is a notification mode, which is different from the vibration mode and serves to prevent the display device 100 from falling over.

In one embodiment, if the safety mode is an audio mode, the display device 100 may provide an notification about the occurred event via audio. In another example, if the safety mode is a silent mode, the display device 100 may provide an notification about the occurred event via an LED alarm or display alarm. In another embodiment, if the safety mode is a weaker vibration mode than the above-described vibration mode, the display device 100 may provide a notification about the occurred event via vibration. Also, in another embodiment, if the safety mode is a vibration mode that provides a different vibration pattern than the above-described vibration mode, the display device 100 may provide an notification about the occurred event via a different vibration pattern. If the folding condition is the second condition, the display device 100 may detect a proximate touch input with respect to the display unit 130.

On the other hand, in operation S920, if the notification mode of the event is not a vibration mode, various other methods of providing a notification may be used (S960). For example, if the notification mode is an audio mode, the display device 100 may provide an notification about the occurred event via audio. Also, for example, if the notification mode is a silent mode, the display device 100 may provide an notification about the occurred event via an LED alarm or display alarm.

Although the respective drawings have been described individually for convenience, the embodiments described in the respective drawings may be combined to realize novel embodiments. In addition, designing a computer readable recording medium in which a program to execute the above-described embodiments is recorded according to a need of those skilled in the art is within the scope of the disclosure.

A display device and a control method thereof according to one embodiment are not limited to the configurations and methods of the above described embodiments, and all or some of the embodiments may be selectively combined to achieve various modifications.

Meanwhile, the control method of the display device may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

As is apparent from the above description, according to one embodiment, in the case in which a display device is stably standing in a vibration mode, the display device may stably provide a notification about occurred event in the vibration mode without tilting of the device.

According to another embodiment, in the case in which a display device is stably standing, the display device may easily detect a direct touch input with respect to a display unit.

According to another embodiment, in the case in which a display device is unstably standing in a vibration mode, the display device may switch from the vibration mode to a safety mode to provide a notification about occurred event in the safety mode, in order to prevent the device from tilting or falling over.

According to a further embodiment, in the case in which a display device is unstably standing, the display device may ignore a direct touch input with respect to a display unit and detect a proximate touch input, thereby easily detecting an input signal without tilting or falling over of the device.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention as well as a method invention, and descriptions of both inventions may be complementarily applied as needed.

What is claimed is:

1. A display device comprising:
   a first body and a second body, wherein a folding portion is provided between the first body and the second body;
   an angle sensing unit configured to sense a folding angle between the first body and the second body;
   an input sensing unit configured to detect an input signal;
   a display unit configured to display visual information;
   a communication unit configured to receive occurrence of an event from an external network; and
   a processor configured to:
   if a notification mode that provides a notification about the occurred event which is received from the external network is a vibration mode, obtain a folding condition, wherein the folding condition includes a first condition in which the folding angle between the first body and the second body is within a predetermined angle range and a second condition in which the folding angle is outside of the predetermined angle range, wherein the first condition and the second condition correspond to a state when the display device is in a standing position in which lower surfaces of the first body and the second body are positioned on a plane,
   if the folding condition is the first condition, maintain the vibration mode and provide the notification about the occurred event via vibration, and
   if the folding condition is the second condition, switch from the vibration mode to a safety mode and provide the notification about the occurred event in the safety mode, wherein the safety mode represents the notification mode different from the vibration mode,
   wherein the predetermined angle range is 45 degrees to 120 degrees and 240 degrees to 315 degrees.

2. The display device according to claim 1, wherein the processor is further configured to:
   provide the notification about the occurred event via audio when the safety mode is an audio mode, and
   provide the notification about the occurred event via a Light Emitting Diode (LED) alarm or display alarm when the safety mode is a silent mode.

3. The display device according to claim 1, wherein the vibration mode is a first vibration mode, and
   wherein the processor is further configured to provide the notification about the occurred event via weaker vibration than that in the first vibration mode when the safety mode is a second vibration mode, and provide the notification about the occurred event via a different vibration pattern than the first vibration mode when the safety mode is a third vibration mode.

4. The display device according to claim 1, wherein the processor is further configured to:
   detect a direct touch input with respect to the display unit when the folding condition is the first condition, and
   detect a proximate touch input with respect to the display unit when the folding condition is the second condition.

5. The display device according to claim 4, wherein the processor is further configured to:
   ignore the proximate touch input with respect to the display unit when the folding condition is the first condition, and
   ignore the direct touch input with respect to the display unit when the folding condition is the second condition.

6. The display device according to claim 1, wherein the processor is further configured to maintain the vibration mode and provide the notification about the occurred event via vibration when the display device is in a standing position by left and right surfaces of the first body and the second body.

7. The display device according to claim 1, wherein the processor is further configured to maintain the vibration mode and provide the notification about the occurred event via vibration when a front surface or a rear surface of at least one of the first body and the second body comes into a contact with an object.

8. The display device according to claim 1, wherein the processor is further configured to:
   provide the notification about the occurred event via audio when the notification mode that provides the notification about the occurred event is an audio mode, and
   provide the notification about the occurred event via an LED alarm or display alarm when the notification mode that provides the notification about the occurred event is a silent mode.

9. The display device according to claim 1, further comprising:
   a third body, wherein a first folding portion is provided between the first body and the second body, and a second folding portion is provided between the second body and the third body, and
   wherein the angle sensing unit is configured to sense a first folding angle between the first body and the second body, and a second folding angle between the second body and the third body.

10. The display device according to claim 9, wherein the processor is further configured to obtain a folding condition, wherein the folding condition includes a first condition in which at least one of the first folding angle and the second folding angle is within the predetermined angle range and a second condition in which the first folding angle and the second folding angle are outside the predetermined angle range.

11. The display device according to claim 1, wherein the notification includes at least one of call notification, message notification, e-mail notification, and SNS notification.

12. The display device according to claim 3, wherein the unstable folding angle is an angle at which the display device cannot stay in the standing position when the display device provides the notification in the first vibration mode.

13. The display device according to claim 1, wherein the outside of the predetermined angle range corresponds to a folding angle in a range of 0 degrees to 45 degrees, 120 degrees to 240 degrees, and 315 degrees to 360degrees.

14. A display device comprising:
    a bendable body;
    an angle sensing unit configured to sense a bending angle of the body;
    an input sensing unit configured to detect an input signal;
    a display unit configured to display visual information;
    a communication unit configured to receive occurrence of an event from an external network; and
    a processor configured to:
    if a notification mode that provides a notification about the occurred event which is received from the external network is a vibration mode, obtain a bending condition, wherein the bending condition includes a first condition in which the bending angle of the body is within a predetermined angle range and a second condition in which the bending angle is outside of the predetermined angle range, wherein the first condition and the second condition correspond to a state when the display device is in a standing position in which lower surfaces of the body are positioned on a plane, if the bending condition is the first condition, maintain the vibration mode, and to provide the notification about the occurred event via vibration, and if the bending condition is the second condition, switch from the vibration mode to a safety mode and provide the notification about the occurred event in the safety mode, wherein the predetermined angle range is 45 degrees to 120 degrees and 240 degrees to 315 degrees.

15. A control method of a display device, the method comprising:

receiving occurrence of an event from an external network;

obtaining a folding condition if a notification mode that provides a notification about the occurred event which is received from the external network is a vibration mode, wherein the folding condition includes a first condition in which a folding angle between a first body and a second body of the display device is within a predetermined angle range and a second condition in which the folding angle is outside of the predetermined angle range, wherein the first condition and the second condition correspond to a state when the display device is in a standing position in which lower surfaces of the first body and the second body are positioned on a plane;

maintaining the vibration mode and providing the notification about the occurred event via vibration if the folding condition is the first condition; and switching from the vibration mode to a safety mode and providing the notification about the occurred event in the safety mode if the folding condition is the second condition, wherein the predetermined angle range is 45 degrees to 120 degrees and 240 degrees to 315 degrees.

16. The control method according to claim 15, further comprising:

providing the notification about the occurred event via audio when the safety mode is an audio mode; and providing the notification about the occurred event via an LED alarm or display alarm when the safety mode is a silent mode.

17. The control method according to claim 15, wherein the vibration mode is a first vibration mode, and wherein the control method further comprises:

providing the notification about the occurred event via weaker vibration than that in the first vibration mode when the safety mode is a second vibration mode; and providing the notification about the occurred event via a different vibration pattern than the first vibration mode when the safety mode is a third vibration mode.

18. The control method according to claim 15, further comprising:

detecting a direct touch input with respect to a display unit when the folding condition is the first condition; and detecting a proximate touch input with respect to the display unit when the folding condition is the second condition.

19. The control method according to claim 18, further comprising:

ignoring the proximate touch input with respect to the display unit when the folding condition is the first condition; and ignoring the direct touch input with respect to the display unit when the folding condition is the second condition.

20. A control method of a display device, the method comprising:

receiving occurrence of an event from an external network;

obtaining a bending condition if a notification mode that provides a notification about the occurred event which is received from the external network is a vibration mode, wherein the bending condition includes a first condition in which a bending angle of a body of the display device is within a predetermined angle range and a second condition in which the bending angle is outside of the predetermined angle range, wherein the first condition and the second condition correspond to a state when the display device is in a standing position in which lower surfaces of the body are positioned on a plane;

maintaining the vibration mode and providing the notification about the occurred event via vibration if the bending condition is the first condition; and switching from the vibration mode to a safety mode and providing the notification about the occurred event in the safety mode if the bending condition is the second condition, wherein the predetermined angle range is 45 degrees to 120 degrees and 240 degrees to 315 degrees.

* * * * *